(12) United States Patent
Thenthiruperai et al.

(10) Patent No.: US 8,880,612 B1
(45) Date of Patent: Nov. 4, 2014

(54) MOBILE DEVICE PROXY FOR INSTANT MESSAGING

(75) Inventors: Balaji S. Thenthiruperai, Overland Park, KS (US); Brian B. Landers, Leawood, KS (US); Kevin E. Hunter, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2230 days.

(21) Appl. No.: 11/013,547

(22) Filed: Dec. 16, 2004

(51) Int. Cl.
*G06F 15/16* (2006.01)
*H04L 12/58* (2006.01)
(Continued)

(52) U.S. Cl.
CPC ............... *H04L 12/58* (2013.01); *H04L 51/14* (2013.01); *H04L 51/04* (2013.01); *H04L*
(Continued)

(58) Field of Classification Search
CPC .............. H04L 12/581; H04L 12/5835; H04L 12/5885; H04L 12/5895; H04L 12/5855; H04L 12/589; H04L 12/1813; H04L 12/185; H04L 12/66; H04L 51/04; H04L 51/066; H04L 51/38; H04L 51/14; H04L 51/36; H04W 4/12; H04W 4/14; H04W 4/18; H04W 88/184; H04M 3/5322; H04M 7/0045
USPC ......... 709/206, 202, 204, 205, 207, 217, 225, 709/228, 229, 230, 232, 246; 455/466, 455/414.1, 419, 412.1, 422.1; 379/88.13
IPC ....... H04L 12/581, 12/5835, 12/5885, 12/5895, H04L 12/5855, 12/589, 12/1813, 12/185, H04L 12/66, 51/04, 51/066, 51/38, 51/14, H04L 51/36; H04W 4/12, 4/14, 4/18, 88/184; H04M 3/5322, 7/0045
See application file for complete search history.

(56) References Cited

U.S. PATENT DOCUMENTS 5,446,759 A * 8/1995 Campana, Jr. ................ 375/267
6,094,574 A * 7/2000 Vance et al. .................. 455/415
(Continued)

OTHER PUBLICATIONS

T-Mobile—Services & Features http://www.t-mobile.com/services/textmessaginq/overview.asp, printed on Mar. 31, 2004.
(Continued)

*Primary Examiner* — Saket K Daftuar (57) ABSTRACT

A proxy for SMS-based wireless instant messaging (IM) is located on a network server. The proxy provides an on-line IM presence for a mobile device user and facilitates multiple cross-platform IM services without requiring protocol specific functionality locally installed on the mobile device. According to an embodiment, the proxy is configured with information about the user such as userID and login information. In operation, the proxy may log into a plurality of IM systems and provide an indication of the user's presence. Upon receiving IM messages directed to the user, the proxy may 1) automatically reply; 2) forward a converted message to the user's current presence; 3) forward a converted message to the user's on-line message repository; and/or 4) store the message for future delivery. The proxy may also provide presence information of contacts for the mobile device user. Upon receiving SMS messages from the user, the proxy may 1) determine the appropriate IM protocol; 2) log-in the appropriate IM system; 3) send the message to the intended recipient.

22 Claims, 6 Drawing Sheets

(51) Int. Cl.
*H04W 88/18* (2009.01)
*H04W 4/12* (2009.01)
*H04W 4/18* (2009.01)
*H04W 4/14* (2009.01)

(52) U.S. Cl.
CPC ...... 12/581 (2013.01); *H04L 51/36* (2013.01); *H04L 12/5885* (2013.01); *H04L 12/5895* (2013.01); *H04L 12/5835* (2013.01); *H04L 51/38* (2013.01); *H04W 88/184* (2013.01); *H04W 4/12* (2013.01); *H04L 12/5855* (2013.01); *H04L 51/066* (2013.01); *H04W 4/18* (2013.01); *H04W 4/14* (2013.01)
USPC .......... 709/206; 709/202; 709/204; 709/205; 709/207; 709/217; 709/225; 709/228; 709/229; 709/230; 709/232; 709/246; 455/466; 455/414.1; 455/419; 455/412.1; 455/422.1; 379/88.13

(56) References Cited

U.S. PATENT DOCUMENTS

| | | | |
|---|---|---|---|
| 6,263,212 B1 * | 7/2001 | Ross et al. | 455/466 |
| 6,397,059 B1 * | 5/2002 | Vance et al. | 455/415 |
| 6,625,460 B1 * | 9/2003 | Patil | 455/466 |
| 6,728,884 B1 * | 4/2004 | Lim | 726/12 |
| 6,732,105 B1 * | 5/2004 | Watson et al. | 707/10 |
| 6,745,230 B1 * | 6/2004 | Cao et al. | 709/206 |
| 6,941,345 B1 * | 9/2005 | Kapil et al. | 709/206 |
| 6,957,390 B2 * | 10/2005 | Tamir et al. | 715/744 |
| 7,188,138 B1 * | 3/2007 | Schneider | 709/203 |
| 7,218,921 B2 * | 5/2007 | Mendiola et al. | 455/414.1 |
| 7,237,201 B2 * | 6/2007 | Fish | 715/753 |
| 7,249,161 B2 * | 7/2007 | Srinivas et al. | 709/206 |
| 7,269,655 B2 * | 9/2007 | Kim | 709/228 |
| 7,337,219 B1 * | 2/2008 | Meenan et al. | 709/220 |
| 7,366,683 B2 * | 4/2008 | Altberg et al. | 705/14 |
| 7,536,463 B2 * | 5/2009 | Seo | 709/227 |
| 7,583,963 B2 * | 9/2009 | Tammi et al. | 455/435.1 |
| 2002/0078371 A1 * | 6/2002 | Heilig et al. | 713/200 |
| 2002/0112014 A1 * | 8/2002 | Bennett et al. | 709/206 |
| 2002/0147836 A1 * | 10/2002 | Flanagin | 709/238 |
| 2002/0187794 A1 * | 12/2002 | Fostick et al. | 455/466 |
| 2003/0120805 A1 * | 6/2003 | Couts et al. | 709/238 |
| 2003/0212772 A1 * | 11/2003 | Harris | 709/220 |
| 2003/0212795 A1 * | 11/2003 | Harris et al. | 709/227 |
| 2004/0078443 A1 * | 4/2004 | Malik | 709/206 |
| 2004/0078444 A1 * | 4/2004 | Malik | 709/206 |
| 2004/0078445 A1 * | 4/2004 | Malik | 709/206 |
| 2004/0105433 A1 * | 6/2004 | Seo | 370/352 |
| 2004/0128356 A1 * | 7/2004 | Bernstein et al. | 709/206 |
| 2004/0162888 A1 * | 8/2004 | Reasor et al. | 709/217 |
| 2004/0193678 A1 * | 9/2004 | Trufinescu et al. | 709/203 |
| 2004/0248600 A1 * | 12/2004 | Kim | 455/466 |
| 2005/0030937 A1 * | 2/2005 | Wick et al. | 370/352 |
| 2005/0041578 A1 * | 2/2005 | Huotari et al. | 370/229 |
| 2005/0041617 A1 * | 2/2005 | Huotari et al. | 370/328 |
| 2005/0059426 A1 * | 3/2005 | Aarnio et al. | 455/550.1 |
| 2005/0080868 A1 * | 4/2005 | Malik | 709/207 |
| 2005/0091362 A1 * | 4/2005 | Shigeta et al. | 709/223 |
| 2005/0159157 A1 * | 7/2005 | Bajko | 455/435.1 |
| 2005/0176428 A1 * | 8/2005 | Gabor et al. | 455/435.1 |
| 2005/0227216 A1 * | 10/2005 | Gupta | 434/322 |
| 2005/0255837 A1 * | 11/2005 | Kwon | 455/414.4 |
| 2006/0030320 A1 * | 2/2006 | Tammi et al. | 455/435.2 |
| 2006/0089971 A1 * | 4/2006 | Wilensky | 709/206 |
| 2006/0206581 A1 * | 9/2006 | Howarth et al. | 709/217 |

OTHER PUBLICATIONS

Stratus Solutions Directory, "Short Message Service Relay Detail", http://www.stratus.com/solutions/catalog/index.cfm?fuseaction=view&product_id=790, printed on Mar. 30, 2004.

Lycos, "Lycos Messenger", http://messenger.lycos.co.uk/messenger, printed Mar. 30, 2004.

Virtual There, Expresso Instant Messaging—Carrier Edition: SMSC Integration, Jan. 2002.

SMS to Email—Email from your Mobile by SMS http://www.funsms.net/sms_to_email.htm.

* cited by examiner

MOBILE DEVICE PROXY FOR INSTANT MESSAGING

FIELD OF THE INVENTION

The present invention relates to telecommunications and wireless instant messaging and, more particularly, to the use of a mobile device proxy to facilitate cross-platform instant messaging in a wireless network.

BACKGROUND

Instant messaging (IM) is an increasingly popular form of communication, at least in part because of the convenience of instantaneous transmission of messages. Much like a telephone conversation, IM is generally used as a method of real-time communication. However, unlike the PSTN used for the telephone conversation, there is no unified or standard network platform for handling IM messages. Rather, many companies have introduced proprietary IM systems using individualized platforms and protocols.

IM is a feature that can be performed at mobile communications devices, such as digital cellular phones. However adequate technology has not been developed for IM services between a mobile device and a plurality of IM systems having varied messaging protocols or platforms ("cross-platform IM").

Despite advances in technology, there are limitations associated with many mobile communications devices ("mobile devices"). Energy and size constraints of mobile devices limit the amount of data storage and processing strength of a mobile device. Wireless communication associated with particular mobile devices, such as cellular telephones, often results in a lower bandwidth or packet flow rate than both wired communications and high-speed wireless communications. And display, input and connectivity constraints of mobile devices all make it difficult to install and use a plurality of functional elements for connecting with varied IM systems. Finally, mobile devices often do not maintain a persistent Internet connection. Thus, it is preferable that a system for cross-platform IM provide a simple and consistent interface at a mobile device that does not require a persistent Internet connection. Additionally, these restrictions should be overcome without sacrificing functions generally associated with IM.

SUMMARY

This disclosure provides a new method and system of cross-platform IM for a mobile device user. According to an exemplary embodiment, a mobile device proxy on a network server provides an on-line presence for a mobile device user. The proxy is configured to handle login tasks, message protocol translation, and routing through a plurality of IM systems, while providing a consistent interface for the mobile device.

The mobile device proxy will preferably operate by registering a mobile device user at a plurality of IM systems, and thus, provide the IM systems with information reflecting presence of the mobile device user. Because of the proprietary nature of the various IM systems, the login and registration process can vary according to the particular IM system. As such, the mobile device proxy is configured with information regarding login procedures at each of the plurality of IM systems.

Once registered, any IM message directed to the mobile device user will be routed to the mobile device proxy. In an exemplary embodiment, the proxy may receive from a sender through a first IM system, a first IM message directed to the mobile device user. The sender may, for example, access the first IM system through a remote device such as a PC connected to the Internet. Thus, the first IM message directed to the mobile device user may be sent from the PC over the Internet to the first IM system, then from the first IM system to the proxy.

After determining that the first IM message is directed to the mobile device user, the proxy will choose a proper course of action. 1) If the mobile device is currently available to receive a message, the proxy may send a payload of the first IM message to the mobile device. The mobile device may notify the proxy that it is currently available through a message to the proxy or in response to a query from the proxy, for example. The payload may be encapsulated by (or incorporated into) a mobile system protocol message such as a Short Message Service ("SMS") message or a Multimedia Message Service ("MMS") message. 2) If a second computing device associated with the mobile device user, such as a home computer, is currently available to receive a message, the proxy may send the payload of the first IM message to the second computing device. The proxy may be configured to communicate with the second computing device through a packet network such as the Internet. 3) If no end-user device, such as the mobile device or second computing device, is currently available to receive a message, the proxy may send the payload of the first IM message to a message repository associated with the mobile device user. The message repository may be a data storage facility at the proxy or may be associated with another location or address, such as an e-mail address. 4) The proxy may also be configured to send a reply message to the sender through the first IM system indicting a presence of the mobile user.

The mobile device user may also send messages from the mobile device. As with incoming IM messages, outgoing messages pass through the mobile device proxy. Generally speaking, the proxy receives an outgoing message from the mobile device. The outgoing message includes a destination user identifier, a destination system identifier, and a payload. The destination user identifier identifies the intended recipient of the message, and the destination system identifier identifies the IM system associated with the intended recipient. The payload may be text, a binary file, or other data.

In order to send the payload of the outgoing message to the intended recipient, the mobile device proxy registers the mobile device user at the plurality of IM systems. Registration may be completed prior to receiving the outgoing message from the mobile device. However, registration may also be initiated in response to receiving the outgoing message from the mobile device. At the time of registration, information reflecting presence of the user or mobile device may be provided to the IM systems according to their respective protocols. Once the recipient IM system is determined, the proxy sends the payload to the recipient at the recipient IM system using the IM protocol/platform associated of the recipient IM system.

The mobile device proxy enables a mobile device to participate in IM with IM users across various IM protocols and platforms. Beneficially, the mobile device need not be configured with protocols and platforms specific to individual IM systems. Rather, the mobile device proxy handles the various IM protocols and platforms, thus presenting the mobile device with a consistent platform—even when sending cross-platform IM messages. In an exemplary embodiment, this design allows for a lighter-weight application at the mobile device.

These and other aspects, advantages, and alternatives will become more apparent to those of ordinary skill in the art by reading the following detailed description, with reference where appropriate to the accompanying drawings. Further, it should be understood that the foregoing summary is merely exemplary and is not intended to limit the scope of the invention as claimed.

AN EXEMPLARY EMBODIMENT

1. Overview

Figure 1:
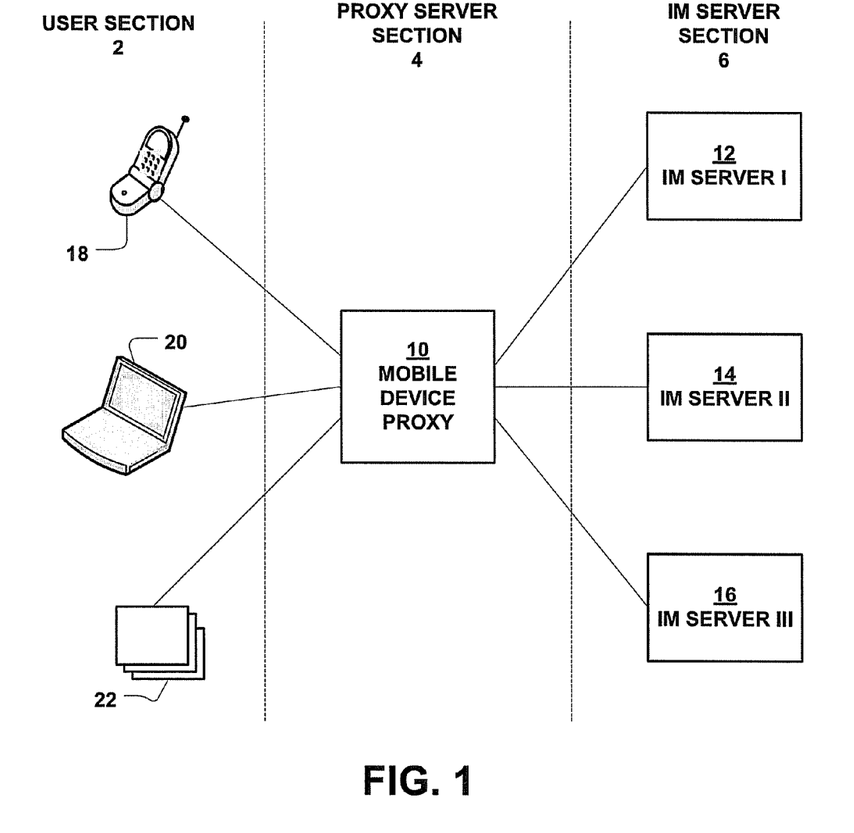
FIG. 1 is a block diagram showing simplified connections between functional elements of an embodiment of the invention.

Referring to the drawings, FIG. 1 is a block diagram showing a simplified cross-platform instant messaging (IM) system and is useful for providing an overview of the invention. FIG. 1 is divided into three sections, a user section 2 at the left, a proxy server section 4 in the center, and an IM server section 6 on the right. In the proxy server section 4 is a mobile device proxy 10 for providing an IM presence for a mobile device user. Located in the IM server section are three IM servers 12, 14, 16. The IM servers may operate using different IM platforms and protocols. Each of the three IM servers is communicatively coupled with the mobile device proxy 10. The user section 2 includes a mobile device 18, a computer 20, and data storage 22, each of which is communicatively coupled with the mobile device proxy 10. The mobile device 18 and computer 20 are regarded as user section devices and may be accessible to the mobile device user.

In operation, the cross-platform IM system provides the mobile device user with the ability to communicate with IM users through the IM servers without requiring cross-platform functionality at the user section devices 18, 20. Specifically, the mobile device proxy 10 is configured to login or register the mobile device user at the IM servers 12, 14, 16 and thus to provide an on-line presence for IM communication. During the login process, the mobile device proxy 10 may spoof a user login sequence by providing information and responses necessary for a user to login to the IM servers. Thus, in this embodiment, a given IM server may not receive any indication that the mobile device proxy 10, rather than an end-user device, is logging into the given server as the user.

During the login process, the mobile device proxy 10 may also provide an indication of the presence and/or current location of the mobile device user or the mobile device 18. Because of differences between the various IM servers, the presence and/or location indicators may vary across IM platforms.

Once the mobile device proxy 10 completes the login process, any IM message sent to the mobile device user from one of the IM servers will be directed to the mobile device proxy 10. Upon receiving the IM message, the mobile device proxy 10 determines that the mobile device user is the addressee. Depending upon user settings and a current location of the mobile device user, the mobile device proxy 10 may send a payload of the IM message to the mobile device 18, computer 20, and/or data storage 22. For example, if the mobile device 18 is currently available for receiving messages, then the mobile device proxy 10 may send the payload of the IM message to the mobile device 18. The mobile device 18 may be currently available if it is currently registered in communication with a wireless radio network operated by an associated wireless carrier. Alternatively, the mobile device 18 may be seen as currently available after sending an SMS message to the proxy 10 indicating that the mobile device 18 is currently available.

When sending the payload to the mobile device 18, the mobile device proxy 10 may package the payload in a mobile device message protocol such as SMS.

The mobile device proxy 10 is also configured to send IM messages from the mobile device 18 to recipients via the IM servers 12, 14, 18. Thus, the mobile device user may cause the mobile device 18 to send to the mobile device proxy 10 an SMS message that includes a destination user identifier, a destination system identifier, and a payload. Based on the SMS message, the mobile device proxy 10 determines an intended recipient of the message and the IM server associated with the intended recipient. The mobile device proxy 10 then sends the payload to the recipient using the IM messaging protocol associated with the recipient IM server.

2. Network Architecture

Figure 2:
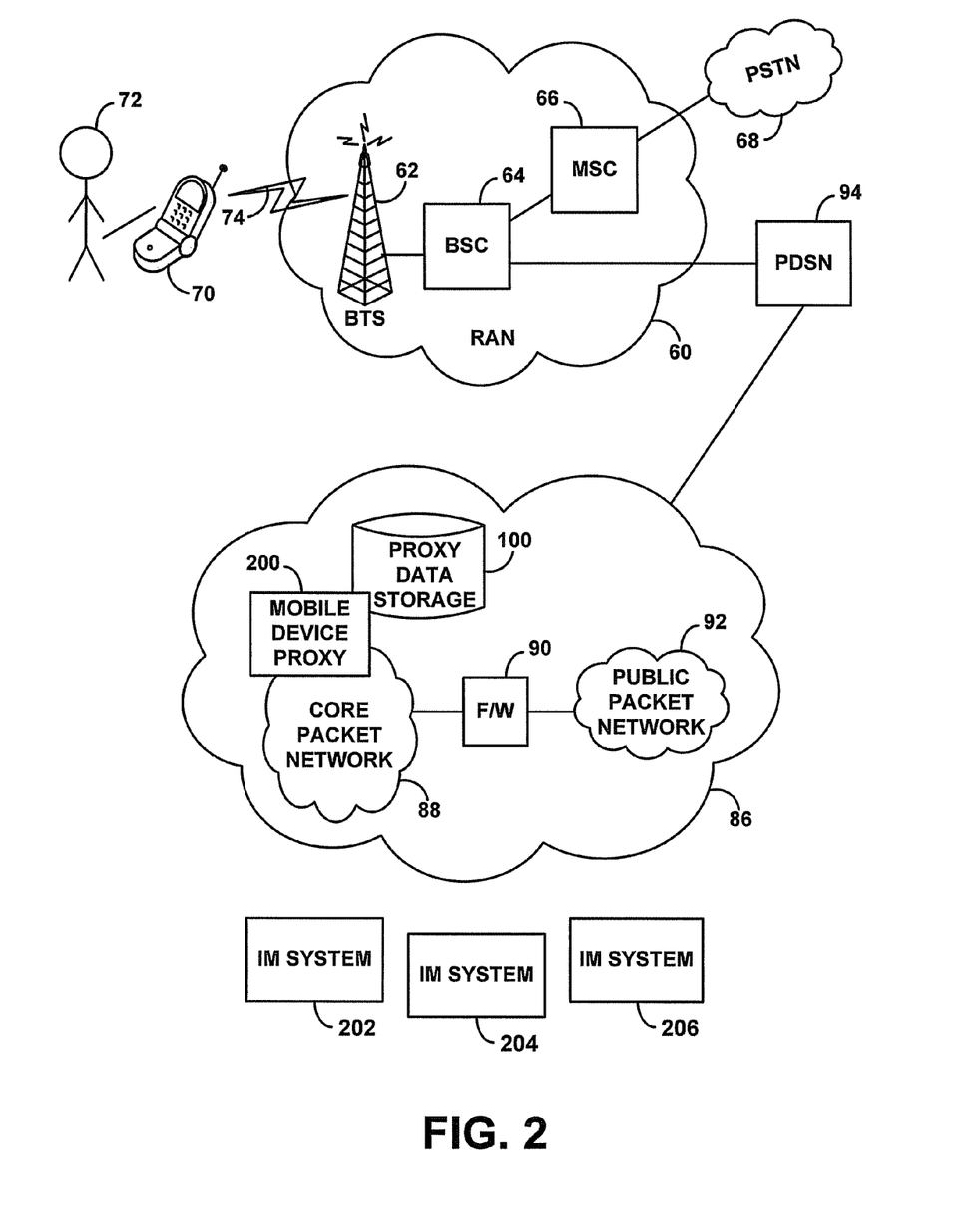
FIG. 2 is a block diagram showing a network architecture in accordance with an exemplary embodiment of the invention.

FIG. 2 shows an arrangement of a network architecture in accordance with the exemplary embodiment. The arrangement of FIG. 2 includes a radio access network (RAN) 60, which functions to provide a wireless access channel through which mobile devices can communicate with each other and/or with other entities on one or more transport networks. The RAN 60 includes a base transceiver station (BTS) 62 that radiates to define one or more coverage areas (e.g., cells, cell sectors, etc.) in which subscriber devices can operate. The BTS 62 is coupled with a base station controller (BSC) 64, which is in turn coupled with a mobile switching center (MSC) 66. The BSC 64 generally controls air interface communications, and the MSC 66 generally controls the RAN 60 and provides connectivity with the public switched telephone network (PSTN) 68. FIG. 2 further illustrates an example mobile device 70, which is preferably a wireless phone, operated by a user 72. Device 70 is in communication over an air interface 74 with the RAN 60 and particularly with BTS 62.

RAN 60 provides a connection with a packet-switched network 86, so as to enable device 70 to engage in packet-data communications. Network 86 can be a private and/or public packet-switched network. As illustrated, in a preferred embodiment, network 86 includes a core packet network 88 operated by the wireless carrier and, connected by a firewall 90 to the core packet network 88, a public packet network 92 such as the Internet. Conventionally, BSC 64 is connected with a packet data serving node (PDSN) 94, which is a network access server providing connectivity with network 86.

In order for device 70 to communicate on network 86, device 70 first acquires packet-data connectivity. In an exemplary arrangement compliant with the well known CDMA2000® protocol, for instance, to acquire packet-data connectivity, device 70 would first send a packet-data origination request over the air interface 74 to RAN 60. When MSC 66 receives the origination request, MSC 66 would then pass the request back to BSC 64, which would forward the request along to PDSN 94. PDSN 94 and device 70 would then negotiate to establish a data link, such as a point-to-point protocol (PPP) session, and PDSN 94 or mobile IP-home agent (not shown) would then assign an IP address to device 70 for use in communications on the network.

Situated as a node in the core packet network 88 is a mobile device proxy 200. The mobile device proxy 200 functions as a proxy server through which the device 70 can communicate with various instant messaging (IM) systems 202, 204, 206. The various IM systems 202, 204, 206 may represent proprietary IM messaging systems. Individual IM users login at their respective IM messaging systems in order to send and receive IM messages. Generally, the login process is through the Internet or another packet network, although an IM user may conceivably login to an IM server directly.

In practice, as IM messages pass through mobile device proxy 200, the mobile device proxy 200 may operate on the messages in various useful ways. By way of example, mobile device proxy 200 may translate payload being delivered to wireless subscriber devices, so as to put the content in a form suitable for delivery to small scale, handheld devices. Further, mobile device proxy 200 may function as an authorization point, to ensure that communications to or from wireless subscriber devices are authorized. For this purpose, mobile device proxy 200 may include or have access to a proxy data storage 100, which similarly includes subscriber profile data such as authorization ID's. Thus, when a communication for device 70 is attempted through mobile device proxy 200, mobile device proxy 200 may refer to the subscriber profile data for device 70 to determine whether the communication is authorized and thus whether to allow the communication to proceed.

Figure 3:
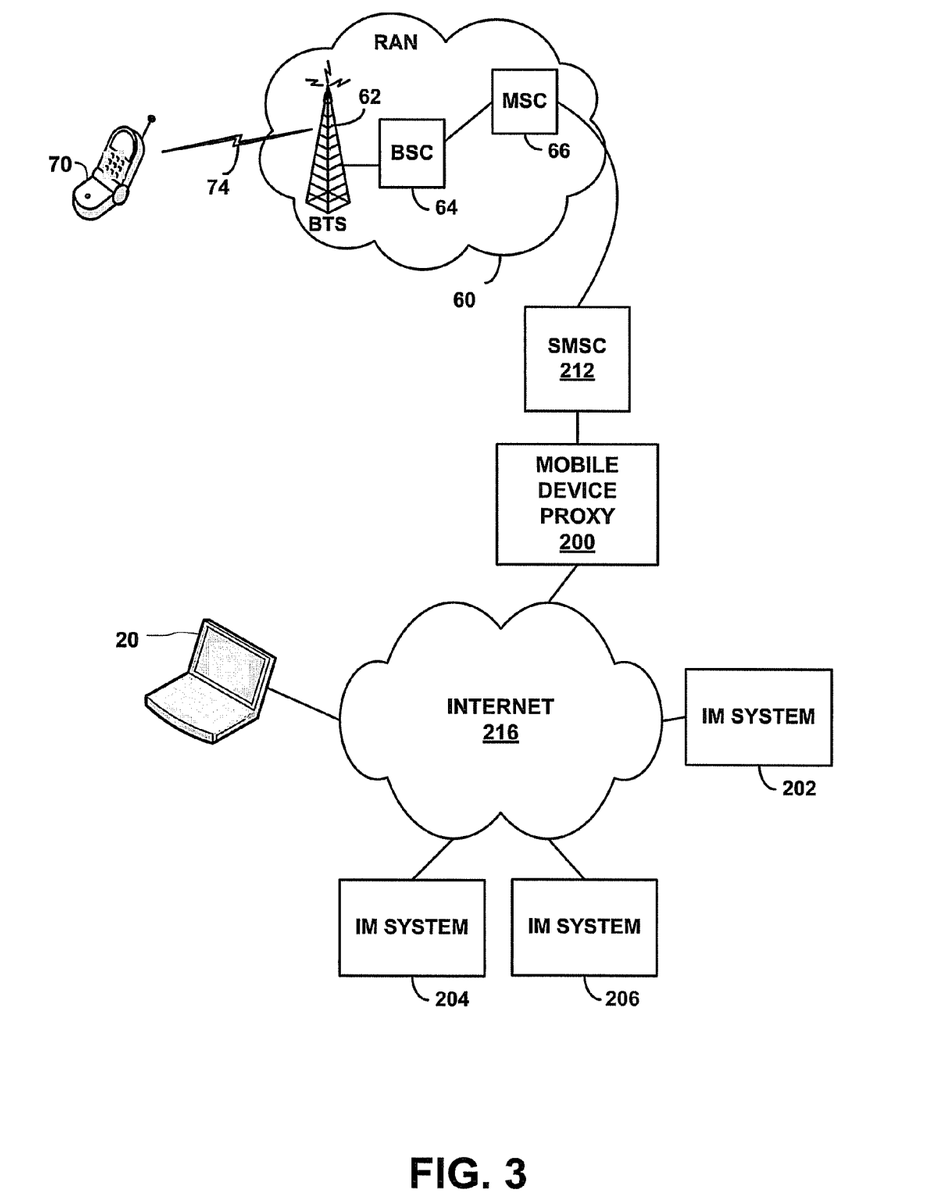
FIG. 3 is a block diagram showing another network architecture in accordance with an exemplary embodiment of the invention.

FIG. 3 shows a further embodiment of a network architecture in accordance with the exemplary embodiment. The arrangement of FIG. 3 includes a radio access network (RAN) 60, which includes a BTS 62 coupled with a BSC 64, which is in turn coupled with a MSC 66. FIG. 3 further illustrates a mobile device 70 in communication over an air interface 74 with the BTS.

In addition, the MSC 66 can interface with a short message service center ("SMSC") 212. An SMSC can store and forward short message service ("SMS") messages, and can allow SMS messages to be exchanged between wireless devices and other networks. The SMS protocol, in turn, provides a way in which short messages can be sent to and from devices, such as the device 70, in the wireless network. In an embodiment, SMS can support the transmission and receipt of alphanumeric messages up to 160 characters long.

As shown, the SMSC 212 may be communicatively coupled to mobile device proxy 200 for enabling cross-platform IM services. The mobile device proxy 200 is then communicatively coupled with a packet switched network such as the Internet 216. One or more IM servers 202, 204, 206 may reside on or be assessable through Internet 216, and may communicate with the mobile device proxy 200. In addition, one or more computing devices, such as a personal computer 20, may also be accessible through Internet 216.

The entities residing on or accessible through the Internet 112 can be arranged in any of a variety of ways. For example, the mobile device proxy 200 might reside on a discrete server that is coupled to the Internet 112 and that is accessible by other network entities. The mobile device proxy 200 might instead reside within another network entity or entities. As another example, the functions of mobile device proxy 200 might be integrated with the functions of another network entity. Other configurations are also possible.

In operation, each wireless device that supports packet-data connectivity can engage in packet-data communication over a packet network, such as the Internet 112, after acquiring a radio link over an air interface and a data link with a packet switched data network (PSDN) or other gateway. As described generally above, for instance, a wireless device, such as the device 70, can send an origination message to a BSC, such as the BSC 64, and/or an MSC, such as the MSC 66, asking for a radio link for packet-data communication. The BSC 64 can then responsively instruct the device 70 to operate on a given traffic channel over the air interface 74. Through that traffic channel, the device 70 might then communicate with the SMSC 212 using SMS messages.

An outgoing SMS message from the device 70 may be delivered to the SMSC 212 and then forwarded to the mobile device proxy 200. After determining an intended recipient of the message and a recipient IM system, the mobile device proxy may then incorporate a payload of the SMS message into an IM message configured for the recipient IM system. The payload may, for example, be a text portion of the outgoing message.

For incoming IM messages (messages directed to the mobile device user), a sender operating through one of the IM systems 202, 204, 206, may send an IM message directed to the mobile device user. The IM message may then be directed to the mobile device proxy 200 via the Internet 216 or other packet network.

The mobile device user may be currently located at mobile device 70, a second computing device, such as personal computer 20, or may be currently away from an end-user device. Thus, after determining that the IM message is directed to the mobile device user, the mobile device proxy 200 attempts to discover the proper location to deliver the message. If, for example, the device 70 is currently available to receive IM messages, then the mobile device proxy 200 will forward a payload of the IM message to the SMSC 212 for delivery to the device 70. (In another embodiment, the mobile device proxy 200 may be configured to send an SMS message to the device without passing through the SMSC 212.) If personal computer 20 is currently available to receive messages addressed to the user, then the mobile device proxy may forward the IM message to the personal computer 20 via the Internet 216 or other packet network. The determination of whether the personal computer 20 is currently available may be based on a message received at the proxy 200 from the personal computer 20 or based on a response by a query from the proxy 200. Once an end-user device, such as the mobile device 70 or personal computer 20, indicate that it is currently available to receive messages, the proxy 200 may store an indication of the available status. Thus, the proxy 200 may determine that an end-user device is currently available to receive messages by retrieving an associated value from data storage. If neither the mobile device 70 nor the personal computer 20 is currently available to receive messages, the mobile device proxy 200 may forward the IM message to a message repository for delivery at a later time.

3. Mobile Device Proxy

The mobile device proxy 200 is generally a network server or other computer or platform. According to the exemplary embodiment, the mobile device proxy is a node of a packet network operated by a wireless carrier. However, the proxy may be located on any packet network that is accessible to the Internet.

Figure 4:
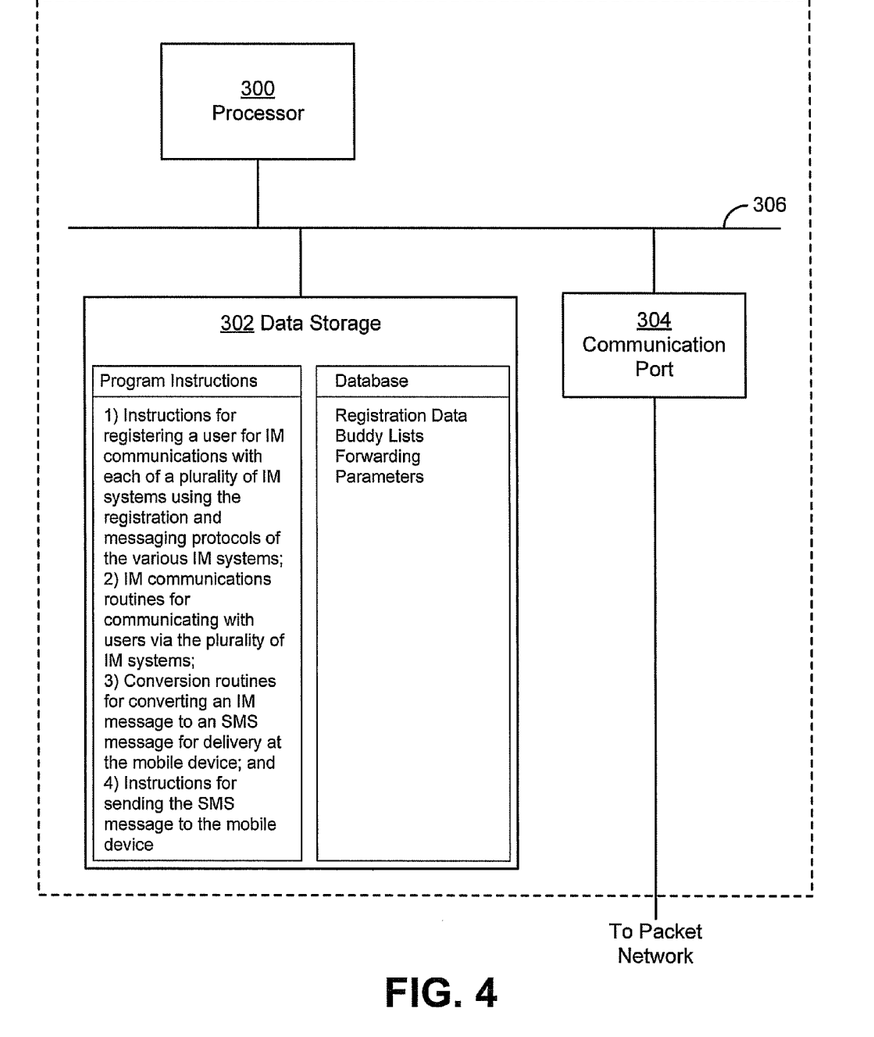
FIG. 4 is a block diagram showing a mobile device proxy server.

FIG. 4 is a block diagram showing an exemplary mobile device proxy. A processor 300 is coupled to data storage 302 via a bus 306, LAN, or other communication mechanism. A communication port 304 provides a link to a packet network, and is coupled to the elements of the proxy via the bus 306.

The data storage 302 is logically (although not necessarily physically) divided into at least two segments. A program instruction segment stores machine readable instruction sets for execution by the processor 300. These instruction sets may include installed software, firmware, or other types of instruction sets. Generally, the instruction sets may include: 1) Instructions for registering a user for IM communications with each of a plurality of IM systems using the registration and messaging protocols of the various IM systems; 2) IM communications routines for communicating with users via the plurality of IM systems; 3) Conversion routines for converting an IM message to an SMS message for delivery at the mobile device; and 4) Instructions for sending the SMS message to the mobile device.

Other instruction sets are available as set forth in various embodiments in the present disclosure and as recognized by those skilled in the art. The instructions may be written in any programming language known to those in the art, such as C, Java, Perl, etc.

A database segment is also included in data storage 302 containing a database. The database includes registration data that correlates the mobile device user with a userID/password for each of the plurality of IM systems. In addition, the database may include buddy lists (or contacts) and forwarding parameters for determining when to forward an IM message to the mobile device or other network entity such as a second computing device or message repository.

Further, the database segment may include storage of parameters indicating whether the mobile device is currently available to receive messages. In one embodiment, receiving an SMS message from the mobile device may trigger the proxy to store an indication that the mobile device is currently available to receive messages. Although not shown, the proxy may further include data storage for storing messages that are awaiting delivery at an end user device.

4. Exemplary Operation

Figure 5:
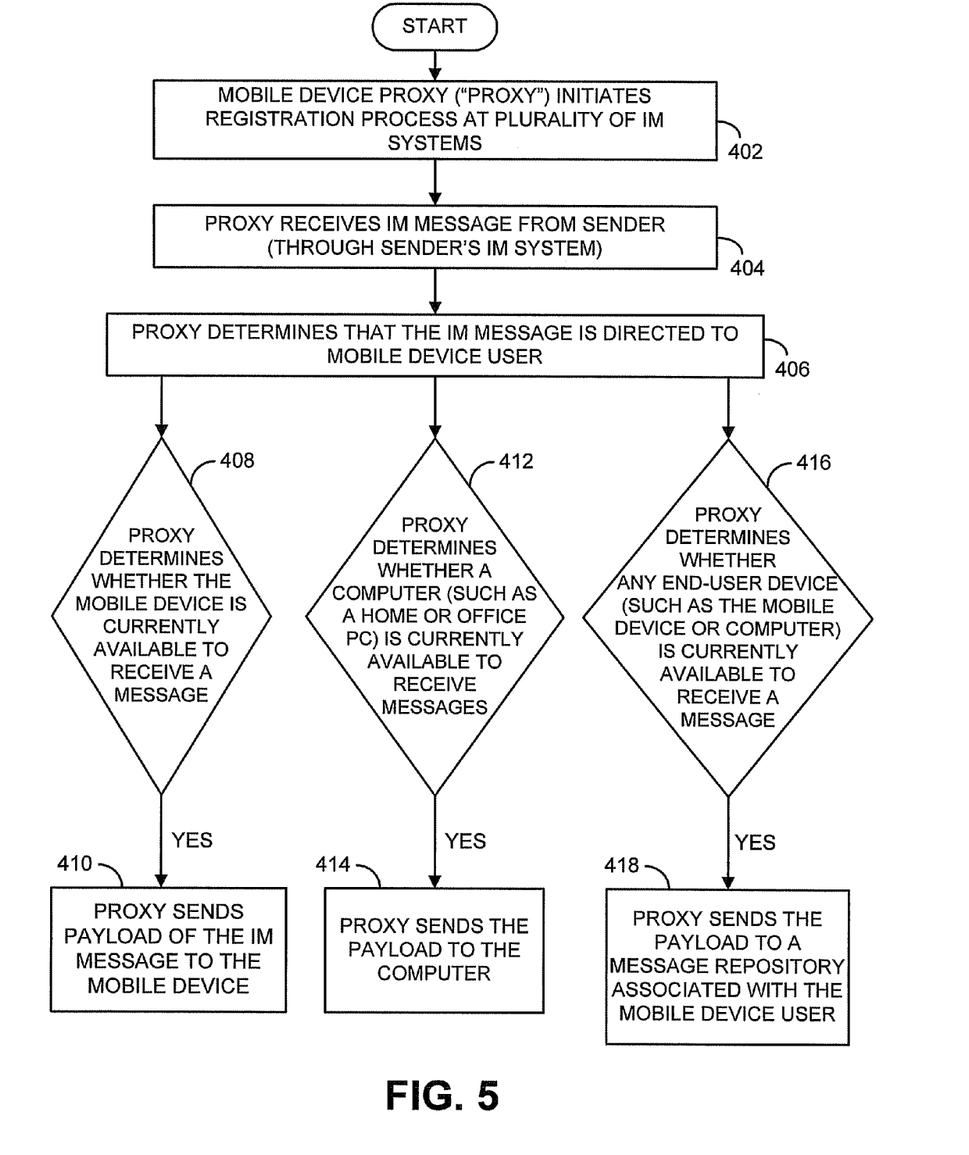
FIG. 5 is a flow chart depicting an IM communication from an IM sender to a mobile device.

One function of the disclosed system is to provide an on-line presence for a mobile device user that allows a sender at an IM system to send an IM message to the mobile device user. FIG. 5 is a flow chart showing communication from the sender to the mobile station user. At 402, the mobile device proxy ("proxy") initiates a registration process at a plurality of IM systems. The registration process includes a login procedure that identifies the proxy address as a network location of the mobile device user. In an exemplary embodiment, the login procedure includes the proxy retrieving userIDs associated with both the mobile device user and the respective IM systems. During the login procedure the userIDs are submitted to the IM systems as identifiers. Thus, in an exemplary login procedure, the proxy submits a login request message to a first IM system. The login request message may include the userID that is the mobile device user's login identifier for the first IM system. The login request may include other information, such as a password or security code. Thus, for AOL® IM, the login request message may include the AOL® screen name and an associated password. In this example, the login request message must be configured to operate within the protocol established for communication through AOL®IM.

The registration process may be triggered by a message from the mobile device user. For example, receiving an SMS message indicating the presence of the mobile device user may cause the proxy to begin the registration process at 402. In this case, the SMS message be directed to the proxy and include a code that is indicative of the presence of the mobile device user. The code, for example, may be a numeric code that indicates the end-device where the mobile device user is located (mobile device, computer, etc.) and whether the device is available to receive IM messages. As a further example of the registration process, the proxy may receive an SMS based registration message from the mobile device that includes an indication that the mobile device user is at the mobile device. In response to the registration message, the proxy takes at least two actions: 1) for each of the IM systems, the proxy retrieves a userID associated with the user; and 2) the userID is submitted to the associated IM system. During the registration procedure, the proxy may receive registration notifications from the IM systems indicating that the procedure is complete. For example, after submitting login information, such as a userID and password, to a given IM system, the proxy may receive from the given IM system a registration notification that indicates that the user is now registered at the given IM system.

Additionally, the registration message may indicate the plurality of IM systems. Thus, the mobile device may provide an indication of the IM systems where the proxy should log-in. Several IM systems are currently available including ICQ, AOL Instant Messenger, MSN Messenger, Yahoo Messenger, for example. A code may be known by the proxy and the mobile device for indicating a set of IM systems where proxy should register. The registration message may include the code as the indication of the selected IM systems. More specifically, the code may be a set of binary (or numerically) encoded identifiers attached at a header of the registration message.

During the registration process and/or afterwards, presence information of the mobile device user may be provided to the IM systems, according to their respective protocols. The presence information may indicate, for example that the mobile device user is currently available to receive messages at either the mobile device or a second computer system. The presence information may alternatively indicate that the mobile device user is currently away from a receiving device. The mobile device user may configure a set of presence parameters that are stored at the proxy. These presence parameters may alter the presence information provided to the IM systems.

In an exemplary embodiment presence information is provided each time a user interacts with the proxy. For example, sending an outgoing message to the proxy from the mobile device may provide an indication that the presence of the user is online at the mobile device and that the mobile device is currently available to receive messages. Further, messages that indicate presence may be sent from the mobile device (or other end-user device) at the behest of the user or in response to a query from the proxy.

At 404, the proxy receives an IM message from the sender (through the sender's IM system). In the exemplary embodiment, the IM message is directed (or addressed) to the mobile device user. However, because the proxy is registered at the IM systems on behalf of the mobile device user, the IM message directed to the mobile device user is routed to the proxy. Although each IM protocol is different, IM messages generally include addressee information in a header of the message. At 406, the proxy determines that the IM message is directed to the mobile device user.

Once the proxy determines that the IM message is directed to the mobile device user, the proxy then forwards at least a payload of the IM message to an appropriate location. The proxy's determination of the appropriate location is exemplified by decision blocks 408, 412, and 416. According to the exemplary embodiment, the proxy may forward the payload to one or more end-user device or repository.

At 408, the proxy determines whether the mobile device is currently available to receive a message. This determination may be based on presence information previously received from the mobile device user. Alternatively, the determination of whether the mobile device is currently available is based on the mobile device's response to a query from the proxy.

If the mobile device is currently available, at 410, the proxy sends a payload of the IM message to the mobile device. In the exemplary embodiment, the proxy communicates with the mobile device using mobile system protocols such as SMS or MMS, for example. Thus, at 410, the payload is incorporated in a mobile system protocol message.

At 412, the proxy determines whether a computer (such as a home or office PC) is currently available to receive messages. This determination may be based on presence information previously received from the mobile device user operating at the computer or at another end user device. Alternatively, the determination of whether the computer is currently available is based on the computer's response to a query from the proxy. If the computer is currently available, at 414, the proxy sends the payload to the computer. At 416, the proxy determines whether any end-user device (such as the mobile device or computer) is currently available to receive a message.

If no end-user device is currently available, at 418, the proxy sends the payload to a message repository associated with the mobile device user. The determination that no end-user device is currently available 416 may logically follow from the determinations that the mobile device is not currently available 408 and that the computer is not currently available 412. However, other end-user devices, such as a second mobile device or a secondary messaging service may be currently available to receive messages directed to the user. According to an exemplary embodiment, the proxy may be configured to send the message payload to multiple locations.

The proxy may be further configured to automatically send a reply message to the sender indicating a presence of the mobile device user. In this case, the presence may, for example be the telephone number of the mobile device—thus indicting that the user is available to receive a telephone call at the mobile device. The reply message may also vary according to the sender. In one embodiment, for instance, the proxy determines a contact category for the sender based on associations stored in the database. The contact category may indicate that the sender is one of a friend, client, or family member, for example. The proxy then configures the reply message based on the contact category. For example, a reply to a client may include a more formal message than a reply to a family member.

Figure 6:
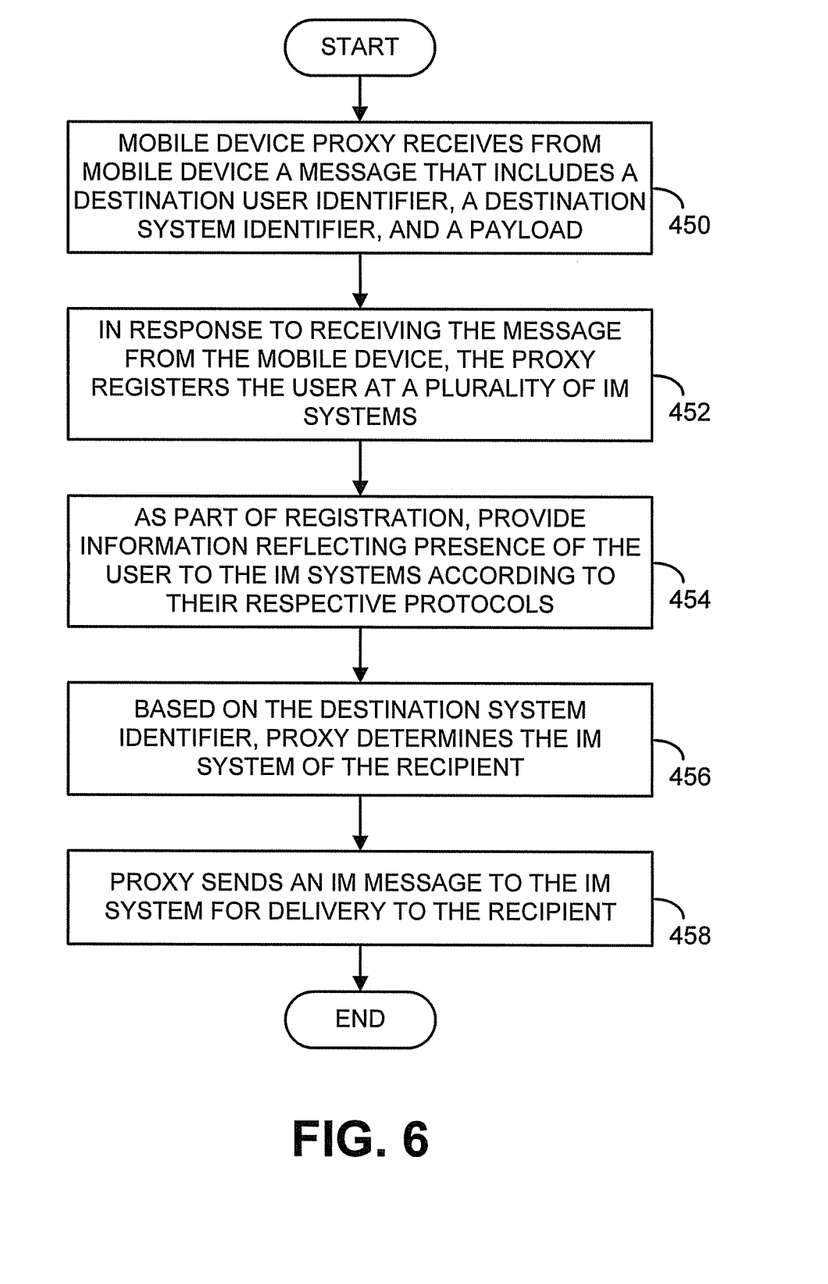
FIG. 6 is a flow chart depicting an IM communication from a mobile device to a recipient.

The disclosed system also provides functionality for the mobile device user to send IM messages to recipients at the various IM systems. FIG. 6 is a flow chart showing communications from the user to a recipient receiving IM messages through an IM system. At 450, the mobile device proxy receives from the mobile device a message, such as an SMS message, that includes a destination user identifier, a destination system identifier, and a payload. Generally, the destination user identifier is a userID associated with the recipient via the recipient's IM system. However, the destination user identifier may also be a nickname, codename, or other identifier that allows the proxy to determine the userID of the recipient at the recipient's IM system. Thus, for example, if the user hopes to send a message to the user's father, the user may send a message having a destination user identifier defined as "dad." The proxy may then use an internal database or name server to determine a userID associated with the nickname "dad."

The destination system identifier is a code or other identifier that allows the proxy to determine the IM system of the recipient. For example, the destination system identifier may be a numeric code such as 001 or 002. The proxy may then use an internal database or a name server to determine that the numeric code relates to a specific IM system. In this example, 001 may refer to AOL® while 002 may refer to MSN®. Other codes may be used.

The payload may be a text message, binary package or other data. At 452, in response to receiving the message from the mobile device, the proxy registers the user at a plurality of IM systems as described above.

According to an exemplary embodiment, if the proxy has already registered the user with the IM server, and the user is engaging in a IM session through the IM server, then an outgoing message from the mobile device will not require the proxy to register again with the IM server. Thus, once the mobile device user is registered at the IM system, the user can engage in back and forth IM sessions without registering again. If the user's registration at an IM system is stopped for any reason, such as a time-out, the proxy may be required to register the user again at the IM system.

At 454, the registration process includes providing information reflecting presence of the user to the IM systems according to their respective protocols. For example, at a first IM system, the proxy may send a message including a presence code to the first IM system, according to the protocol of the first IM system and where the presence code is indicative of the presence of the user. The steps involved in providing presence information to the various IM systems can vary depending upon the design of the various IM systems. The presence information may, for example, include information reflecting whether the mobile device is currently available to receive messages. In addition, the presence information may include a current geographic location of the mobile device. Such geographic location information may come from a location tracker at the mobile device, such as a GPS receiver, through a location calculator at the wireless network, for example. In yet another embodiment, the presence information includes information reflecting the user is operating through the mobile device proxy. The presence information may also or alternatively be set by the mobile device user according to user presence.

At 456, based on the destination system identifier, the proxy determines the IM system of the recipient as explained above.

Once the IM system of the recipient is determined, the proxy sends an IM message to the IM system for delivery to the recipient at 458. The IM message sent to the recipient includes the payload and is sent according to the protocol of the recipient IM system. The proxy may also send a reply SMS message to the mobile device user indicating that the message has been forwarded to the recipient IM system. The reply SMS message may, for instance, follow the same pathway as other SMS communications between the proxy and mobile device user. In addition, the reply message may provide an indication of a presence of the recipient that has been received by the proxy from the recipient's IM system. The indication of the presence of the recipient may be included as a text, graphic, or code recognizable by end-user client software. Thus, the mobile device user may have an indication of whether the recipient has actually received the message.

According to a preferred embodiment, the mobile device user encounters a single interface regardless of the recipient IM system. In addition, the mobile device is not required to load the assorted software packages associated with the various IM systems. Thus, the mobile device operates through a single interface and protocol regardless of a recipient or sender's IM system because the mobile device proxy handles the tasks of protocol specification and message type conversion.

An exemplary embodiment of the present invention has been described above. Those skilled in the art will understand, however, that changes and modifications may be made to this embodiment without departing from the true scope and spirit of the present invention, which is defined by the claims. For example, although messages have been described as being directed toward a single recipient, it is expected that a single message could be directed toward a plurality of recipients across the various IM systems. In addition, elements described as a single device, such as the mobile device proxy, can be embodied in a more distributed fashion without altering the functionality of the system.

The invention claimed is:

1. A method of two-way communication comprising:
at a device proxy that communicates with a mobile device and with a plurality of instant messaging (IM) systems and that provides cross-platform IM functionality for at least the mobile device, registering with the plurality of IM systems on behalf of a user of the mobile device according to respective IM protocols of the plurality of IM systems, so that IM messages thereafter destined to the user from any one of the IM systems will be routed to an address of the device proxy for transmission in turn from the device proxy to the user, wherein at the time of registering with the plurality of IM systems on behalf of the user, information reflecting presence of the user is provided to each of the IM systems;
at the device proxy, receiving a first IM message from a sender via a first IM system of the plurality of IM systems;
at the device proxy, determining that the first IM message is directed to the user; and
if the mobile device is currently available to receive a message, sending a payload of the first IM message according to a mobile system protocol from the device proxy to the mobile device.

2. The method of two-way communication of claim 1 further comprising:
if a computing device associated with the user is currently available to receive a message, sending the payload of the first IM message from the device proxy to the computing device; and
if neither the mobile device nor the computing device is currently available to receive a message, sending the payload of the first IM message from the device proxy to a message repository associated with the user.

3. The method of two-way communication of claim 1 further comprising, in response to the device proxy receiving the first IM message, automatically sending a reply message from the device proxy to the sender indicating a presence of the user.

4. The method of two-way communication of claim 3, wherein automatically sending a reply message comprises:
determining a contact category for the sender;
configuring the reply message based on the contact category; and
sending the reply message.

5. The method of two-way communication of claim 3, wherein the reply message includes a telephone number of the mobile device, thus indicating that the user is available to receive a telephone call at the mobile device.

6. The method of two-way communication of claim 1, wherein the mobile system protocol is a short messaging service protocol.

7. The method of two-way communication of claim 1, wherein the information reflecting presence of the mobile device user is indicative of whether the mobile device is currently available to receive messages.

8. The method of two-way communication of claim 1, wherein registering with the plurality of IM systems on behalf of the user of the mobile device comprises:
receiving a short messaging service message indicating that the mobile device is currently available to receive messages; and
responsively executing a login sequence for each of the plurality of IM systems, wherein for each IM system of the plurality of IM systems, the device proxy retrieves from data storage a userID associated with both the user and the IM system and submits the userID to the IM system.

9. The method of two-way communication of claim 8, wherein the short messaging service message indicating that the mobile device is currently available to receive messages comprises:
a destination system identifier to identify the IM system associated with the recipient;
a destination user identifier to identify the recipient; and
a message payload.

10. The method of two-way communication of claim 9 further comprising, in response to receiving the short messaging service message from the mobile device, storing an indication that the mobile device is currently available to receive messages.

11. The method of two-way communication of claim 1, wherein registering with the plurality of IM systems on behalf of the user of the mobile device comprises:
receiving a short messaging service registration message from the mobile device including an indication that the user is at the mobile device;
in response to the registration message from the mobile device: (i) retrieving from data storage a plurality of userIDs, wherein each userID is associated with both the mobile device and one of the plurality of IM systems, and (ii) submitting each userID to its associated IM system; and
receiving registration notifications from the respective IM systems.

12. The method of two-way communication of claim 11, wherein the registration message further includes an indication of the plurality of IM systems, thereby indicating to the device proxy which IM systems the device proxy should register with on behalf of the user.

13. The method of two-way communication of claim 12, wherein the indication of the plurality of IM systems includes a set of coded identifiers at a header of the registration message, wherein the set of coded identifiers includes an identifier for each of the plurality of IM systems.

14. A method of two-way communication comprising, at a mobile device proxy configured to provide cross-platform IM functionality for a mobile device:
receiving a first message from the mobile device, wherein the first message includes a destination user identifier, a destination system identifier, and a payload;

registering a user of the mobile device at a plurality of IM systems, wherein information reflecting presence of the user is provided to the IM systems according to their respective protocols;

based on the destination system identifier, determining a recipient IM system; and sending a second message to a recipient at the recipient IM system, wherein the destination user identifier is included with the second message to identify the recipient, and wherein the payload is included with the second message.

15. The method of two-way communication of claim 14 wherein registering the user of the mobile device is done in response to receiving the first message.

16. The method of two-way communication of claim 14 wherein the information reflecting presence of the user includes information reflecting that the mobile device is currently available to receive messages.

17. The method of two-way communication of claim 16, further comprising providing a current geographic location of the mobile device to the plurality of IM systems.

18. The method of two-way communication of claim 14 further comprising:

the mobile device proxy receiving a third message from the recipient in response to the second message;

the mobile device proxy determining that the third message is directed to the user of the mobile device;

if the mobile device is currently available to receive a message, the mobile device proxy sending a payload of the third message to the mobile device;

if a second computing device associated with the mobile device user is currently available to receive a message, the mobile device proxy sending the payload of the third message to the second computing device; and if neither the mobile device nor the second computing device is currently available to receive a message, the mobile device proxy sending a fourth message to a message repository associated with the mobile device user, wherein the fourth message includes the payload of the third message.

19. The method of two-way communication of claim 14, wherein the destination system identifier comprises a first numeric code, wherein the mobile device proxy is configured to decode the first numeric code.

20. The method of two-way communication of claim 19, wherein the information reflecting presence of the user comprises a second numeric code, wherein the mobile device proxy is configured to decode the second numeric code.

21. The method of two-way communication of claim 20, wherein the destination user identifier comprises a third numeric code, wherein the mobile device proxy is configured to decode the third numeric code.

22. A mobile device proxy for SMS-based wireless instant messaging (IM) comprising a network server including:

a processor for executing program instructions, a communication interface for providing communication with a packet network; and data storage containing program instructions executable by the processor to:
(i) register for IM communications with each of a plurality of IM systems on behalf of users of mobile devices wherein the instructions enable the processor to use registration and messaging protocols of the respective IM systems during registration,
(ii) communicate with users at the plurality of IM systems through IM messages,
(iii) receive an outgoing SMS message from a mobile device,
(iv) based on a header of the SMS message, determine a recipient IM system associated with an intended recipient of the SMS message,
(v) convert the SMS message to an IM protocol of the recipient IM system and send the converted message to the recipient at the recipient IM system, wherein the data storage further contains a database of associations between userIDs and IM systems, wherein each userID is associated with both a mobile device and an IM system, and wherein the database is used during the registration process.

* * * * *